US008699790B2

(12) United States Patent
Liu et al.

(10) Patent No.: US 8,699,790 B2
(45) Date of Patent: *Apr. 15, 2014

(54) METHOD FOR PAN-SHARPENING PANCHROMATIC AND MULTISPECTRAL IMAGES USING WAVELET DICTIONARIES

(75) Inventors: Dehong Liu, Lexington, MA (US); Petros T. Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 94 days.

This patent is subject to a terminal disclaimer.

(21) Appl. No.: 13/478,510

(22) Filed: May 23, 2012

(65) Prior Publication Data

US 2013/0129201 A1    May 23, 2013

Related U.S. Application Data

(63) Continuation-in-part of application No. 13/299,847, filed on Nov. 18, 2011.

(51) Int. Cl.
*G06K 9/00* (2006.01)
(52) U.S. Cl.
USPC .......................................................... 382/160
(58) Field of Classification Search
None
See application file for complete search history.

(56) References Cited

U.S. PATENT DOCUMENTS

| 5,949,914 A * | 9/1999 | Yuen ............................. 382/254 |
| 6,011,875 A * | 1/2000 | Laben et al. ................... 382/276 |
| 7,385,705 B1 * | 6/2008 | Hoctor et al. ................. 356/456 |
| 2009/0226114 A1 * | 9/2009 | Choi et al. ..................... 382/284 |
| 2010/0069758 A1 * | 3/2010 | Barnes et al. .................. 600/473 |

OTHER PUBLICATIONS

Li et al. "A New Pan-Sharpening Method Using a Compressed Sensing Technique", IEEE Trans. Geosci. Remote Sens., vol. 49(2), pp. 738-746, Feb. 2011.*
Elad et al., "Image Denoising Via Sparse and Redundant Representations Over Learned Dictionaries," IEEE Trans. Image Proc., vol. 15(12), pp. 3736-3745, Dec. 2006.*
Mairal et al., "Learning multiscale sparse representations for image and video restoration," SIAM Multiscale Model. Simul., vol. 7, No. 1, pp. 214-241, Apr. 2008.*
Aharon et al., "K-SVD: an algorithm for designing overcomplete dictionaries for sparse representation," IEEE Trans. Sig. Proc., vol. 54(11), pp. 4311-4322, 2006.*

* cited by examiner

*Primary Examiner* — Bhavesh Mehta
*Assistant Examiner* — Feng Niu
(74) *Attorney, Agent, or Firm* — Dirk Brinkman; Gene Vinokur

(57) ABSTRACT

A method Pan-sharpens a single panchromatic (Pan) image and a single multispectral (MS) image. A wavelet transform is applied to the Pan image and the MS image to obtain a wavelet transformed Pan image and a wavelet transformed MS image. Features, in the form of vectors, are extracted from the wavelet transformed Pan image and the wavelet transformed MS image. The features are separated into features without missing values and features with missing values. A dictionary is learned from features without missing values and used to predict the values for the features with the missing values. After the predicting, the features of the low frequency wavelet coefficients and the high frequency coefficients to form a fused wavelet coefficient map, and an inverse wavelet transform is applied to the fused wavelet coefficient map to obtain a fused MS image.

16 Claims, 2 Drawing Sheets

1: Input $\epsilon_0$, $K$, $\lambda$, and $T_0$
2: initialize $k=0$, err $=1$, $\mathbf{X}_0^{MS} = \bar{\mathbf{X}}^{MS}$.
3: while $k < K$ and err $> \epsilon_0$ do
4: $\quad k = k+1$
5: $\quad \tilde{\alpha} = \mathrm{argmin}_\alpha \|\mathbf{X}_{k-1} - \tilde{\mathbf{D}}\alpha\|_F^2 \quad$ s.t. $\forall l, \; \|\alpha_l\|_0 \leq T_0$
6: $\quad \tilde{\mathbf{X}}_k = \tilde{\mathbf{D}}\tilde{\alpha}$
7: $\quad \mathbf{X}_k^{MS} = \dfrac{\mathbf{E}^{MS}\tilde{\mathbf{X}}_k + \lambda \bar{\mathbf{X}}^{MS}}{1+\lambda}$
8: $\quad \mathbf{X}_k = \left[ \, (\mathbf{X}_k^{MS})^T \; (\mathbf{X}^{Pan})^T \, \right]^T$
9: $\quad$ err $= \dfrac{\|\mathbf{X}_k^{MS} - \mathbf{X}_{k-1}^{MS}\|_F}{\|\mathbf{X}_k^{MS}\|_F}$
10: end while
11: Output $\hat{\mathbf{X}} = \mathbf{X}_k$.

Pseudo code of iterative procedure to minimize objective function

*Fig. 2*

METHOD FOR PAN-SHARPENING PANCHROMATIC AND MULTISPECTRAL IMAGES USING WAVELET DICTIONARIES

RELATED APPLICATIONS

This U.S. Non-Provisional Application is a continuation-in-part of a related to U.S. patent application Ser. No. 13/299,847, "Method for Pan-Sharpening Panchromatic and Multi-spectral Images Using Dictionaries," file by Liu et al. on Nov. 18, 2011. The related Application describes Pan-sharpening using sparse dictionaries in the image domain, and is incorporated herein by reference.

FIELD OF THE INVENTION

This invention relates generally to Pan-sharpening images, and more particularly to sharpening Panchromatic and multi spectral images using dictionaries.

BACKGROUND OF THE INVENTION

Many optical satellite imaging systems produce two kinds of images: Panchromatic (Pan) and multi-spectral (MS). Pan images typically provide high spatial resolution but no color information, whereas MS images typically provide color spectrum information but reduced spatial resolution.

For a large number of applications, high resolution (HR) MS images are preferred. The HR MS images, which are not readily available from the satellite, can only be obtained by fusing the Pan and MS images. This fusion process is referred to as Pan-sharpening.

A number of Pan-sharpening methods are known. Those methods can be partitoned in four categories: Intensity-Hue-Saturation (IHS) transform based methods, Principal Component Analysis (PCA) based methods, arithmetic combination based methods and wavelet-based methods.

Generally, Pan-sharpened images generated by methods in the first three categories have good spatial resolution, but a distorted color spectrum. Those using wavelet-based methods exhibit relatively better color spectrum, but produce wavelet-induced artifacts.

A variety of methods to improve spatial and spectral accuracy have are known, each specific to a particular fusion technique or image set.

Compressive sensing, sparse representations and dictionary learning (DL) provide tools to address this problem. Those methods assume that the HR MS image is sparse in some basis or dictionary. The HR MS image is recovered using sparsity promoting optimization methods, subject to data fidelity constraints derived from the available LR MS and FIR Pan images. The choice of basis or dictionary is often critical in the performance of such methods. It is known that a large number of sparsity-based methods can benefit significantly from an appropriate sparsity-inducing dictionary learned from available data.

SUMMARY OF THE INVENTION

In satellite image processing, Pan-sharpening is an image fusion process in which a low resolution (LR) multi-spectral (MS) image is sharpened using a corresponding high resolution (HR) Panchromatic (Pan) image to achieve a HR MS image.

The embodiments of the invention provide a Pan-sharpening method which combines wavelet-based Pan-sharpening with dictionary learning (DL) methods.

The HR MS image is generated using wavelet-based Pan-sharpening, regulated by promoting sparsity in a dictionary learned from the multi-scale wavelet tree vectors of the image to be Pan-sharpened.

A significant advantage of our method, over most conventional DL-based methods is that our method does not require a large database of images on which to train the dictionary.

Our method significantly reduces color distortions and wavelet artifacts compared to the prior art methods.

In contrast to conventional DL approaches, we learn the dictionary from a single HR Pan and LR MS image, i.e., the image to be Pan-sharpened. Thus, we do not require prior training on scarce large image datasets, as typically required by a number of prior art DL methods.

Our method applies a discrete wavelet transform on the MS and Pan images to extract the low frequency coefficients from the MS image and the high frequency coefficients from the Pan image.

The coefficients are combined (fused) to generate the fused wavelet coefficient map. The final Pan-sharpened image is then generated by performing an inverse wavelet transform on the fused map.

Instead of simply combining the coefficients in an obvious naïve way, we posit that each wavelet-tree vector of the fused map can be sparsely represented by dictionary learned from the wavelet-tree vectors of the Pan image.

One assumption is that a dictionary learned from the wavelet transform of HR Pan image captures the structure of the image much better than the wavelet transform itself.

The final coefficients are consistent with the data, and sparse in the learned dictionary, yielding a HR MS image with fewer color distortions and fewer wavelet artifacts.

BRIEF DESCRIPTION OF THE DRAWINGS

FIG. 2 is a block diagram of pseudo code of a procedure to minimize an objective function for predict the missing data according to embodiments of the invention.

DETAILED DESCRIPTION OF THE PREFERRED EMBODIMENTS

Figure 1:
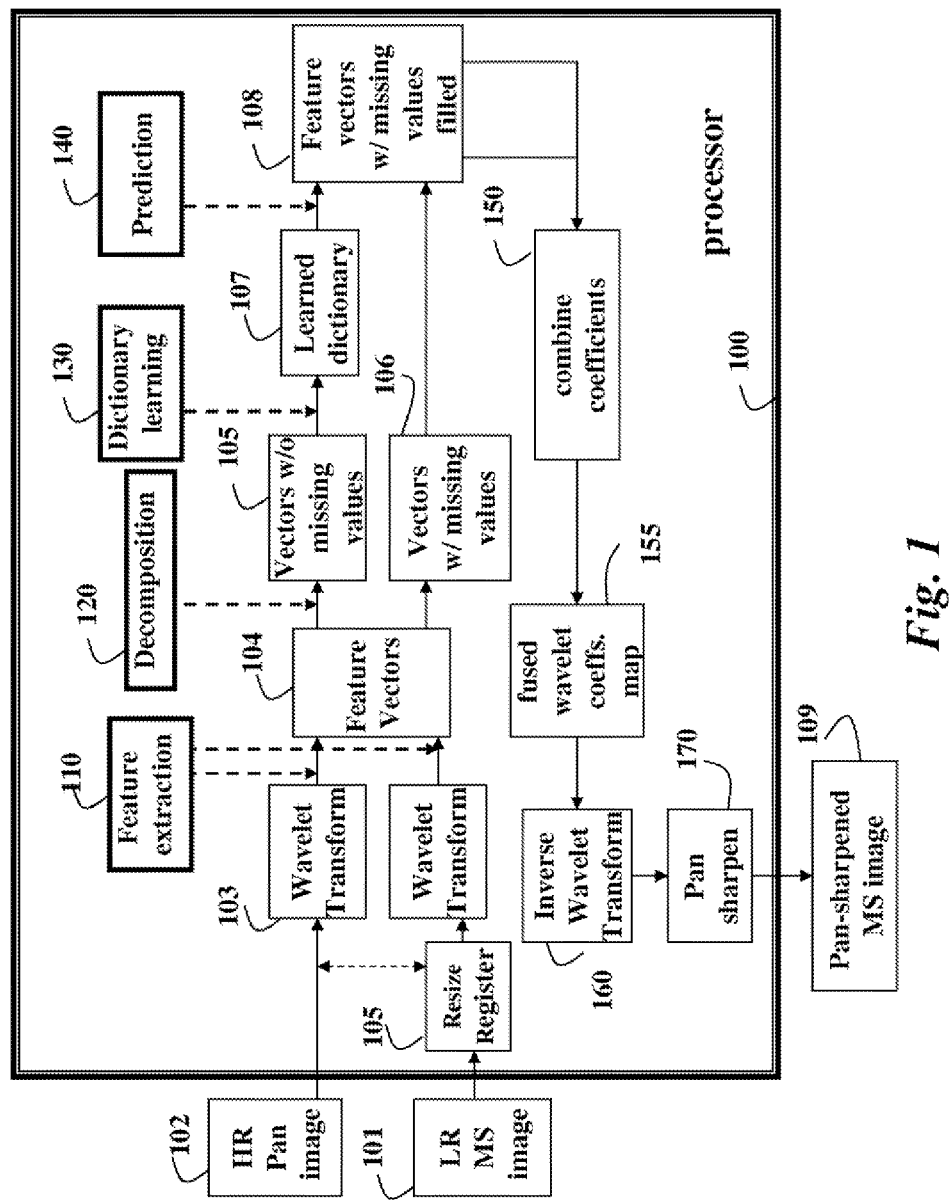
FIG. 1 is a flow diagram of Pan-sharpening panchromatic and multispectral images using dictionaries and wavelet transforms according to embodiments of the invention.

Dictionary Learning Based Pan-Sharpening
Sparse Representations and Dictionary Learning Natural images are compressible in the descrete cosine transform (DCT) or a wavelet domain, i.e., the images can be sparsely represented with very few distortions using a DCT or a wavelet basis. This property is the foundation for a large number of image acquisition, processing and compression methods. The main advantage in using these transformations to representing a signal is their efficient implementation.

In dictionary learning (DL), a dictionary learned from training data, instead of a pre-determined basis, can result in even sparser representations for signals in a particular class or domain. This domain-specific dictionary is able to capture in the learning process the similarities in the structure of the training data and exploit this structure in sparsely representing the data.

In the related application, a method for Pan-sharpening uses dictionary learning in the image domain to reduce color distortion caused by the interpolation of the MS images. Instead of interpolating the LR MS image before merging, there we generate an improved MS image based on sparse representation of learned dictionary using an iterative process, see U.S. patent application Ser. No. 13/299,847, "Method for Pan-Sharpening Panchromatic and Multispectral Images Using Dictionaries, file by Liu et al. on Nov. 18, 2011.

Dictionary learning learns a set of vectors (atoms), which can be used to sparsely represent a signal. Typical sparse approximation problems consider a signal $y \in R^{n \times 1}$ and attempt to represent it using $y=D\alpha$, where $D \in R^{n \times k}$ is the dictionary that contains the atoms as its columns and $\alpha \in R^{k \times 1}$ is a sparse representation vector. The sparsity of $\alpha$ captures the structure of the signal with respect to the dictionary: the linear combination of a few atoms from D is able to represent the signal y with small error.

Dictionary learning uses a training set of signals to learn D, assuming that other signals (testing data) in the same domain exhibit similar structure and also produce good sparse representations in the learned dictionary. All training signals are assumed to be sparsely representable under D, each with a different linear combination of few atoms. Most DL methods alternate between sparsely representing the training data using a given dictionary, and then updating that dictionary given the sparse representation of the data, until convergence.

Multi-Scale Wavelet Dictionary

To perform Pan-sharpening, we use one LR MS image and the corresponding HR Pan image. In our earlier work on image-domain DL-based Pan-sharpening, the dictionary is learned using small image patches. Instead, now we learn a wavelet-domain dictionary using multi-scale wavelet tree vectors.

To construct the dictionary atoms, we consider a quad-tree structure with different sized blocks at each wavelet decomposition level. All levels are used to make up one joint global dictionary. We assume the Pan image has N times the spatial resolution and size of the LR MS image, and the LR MS image is composed of M spectral bands.

In our present method we treat each color-band of the MS image independently. We first resize or interpolate the LR MS image to the size of the Pan image, and then register the MS image with the Pan image using sub-pixel registration methods. A K-level wavelet decomposition is performed on both the Pan and the interpolated MS images to form the wavelet-tree representation of the image.

From this decomposition, we obtain detailed coefficients at every scale to construct the dictionary atoms. Each atom is composed of the coefficients in a small patch of the detail coefficients at the coarsest scale, together with the detail coefficients in the corresponding larger patches from finer scales:

$$x_{Pan}=[(x_{Pan}^L)^T (x_{Pan}^H)^T]^T, \text{ and}$$

$$x_{MS}=[(x_{MS}^L)^T (x_{MS}^H)^T]^T,$$

where the subscripts 'Pan' and 'MS' denote Pan and MS images respectively, the superscript $L$ denotes the coarsest scale, and $H$ denotes all the remaining finer scales.

We select the patches to tile the entire wavelet decomposition and use $$X_{Pan}=[(X_{Pan}^L)^T (X_{Pan}^H)^T]^T, \text{ and}$$

$$X_{MS}=[(X_{MS}^L)^T (X_{MS}^H)^T]^T,$$

to denote the matrices containing all of patches.

Conventional wavelet-based Pan-sharpening methods fuse the coefficients using $[(X_{MS}^L)^T (X_{Pan}^H)^T]^T$ to estimate the transform of the HR MS image $\hat{X}_{MS}$, given matched the $L_2$ norm between $X_{Pan}^L$ and $X_{MS}^L$.

Instead, we use a dictionary to regulate the fusion, assuming that the HR MS image, estimated in $\hat{X}_{MS}$, is sparse in the same dictionary.

To achieve a data-dependent dictionary D, we learn from the atoms of Pan image using the K-SVD method $$D = \operatorname{argmin}_{D,\alpha} \|X_{Pan} - D\alpha\|_F^2 \text{ s.t. } \forall l \|\alpha_l\|_0 \leq T_0, \quad (1)$$

where $\alpha=[\alpha_1, \alpha_2, \ldots, \alpha_L]$ is the set of sparse coefficient vectors corresponding to the L training vectors, $T_0$ is the desired sparsity level, and $\|\cdot\|_F$ denotes the Frobenius norm.

Although the learned dictionary performs well, as described by our previous image-domain DL work, the computation of learning process is relatively complex.

To develop an efficient method for dictionary based Pan-sharpening, an alternative way to learn dictionary is to use features comprised of localized tree vectors as dictionary atoms rather than learning from the whole tree vectors. This is motivated by the fact that for natural images, a patch of particular structure tends to recur often in its closest vicinity, and its frequency of recurrence decays rapidly as the distance from the patch increases. Therefore, a localized dictionary can outperform learned dictionary and reduce training time.

Toward this end, for each tree vector of MS image, we learn a localized dictionary to represent the vector. The spatial location of each tree vector is the root coordinate index in the coarsest level. The localized dictionary is composed of a set of tree vectors centered at spatial location $(i_0, j_0)$ within radius $r_0$, as $$D_{i_0, j_0} = \{\{x_{Pan}\}_{i,j} | \sqrt{(i_0-i)^2 + (j_0-j)^2} \leq r_0\}, \quad (2)$$

by which the wavelet-tree vector at the center location $(i_0, j_0)$ of the MS image is sparsely represented.

The localized learned dictionary is a special case of a dictionary learned using the K-SVD in by setting the sparsity level $T_0=1$ and using a localized training set in equation (1). This approach is computationally more efficient and often results to sharper images.

Pan-Sharpening Using Wavelet Dictionary

Given the learned dictionary D, the reconstruction optimizes an objective function $$\hat{X}_{MS} = \operatorname{argmin}_{X,\alpha} \|X - [(X_{MS}^L)^T (X_{Pan}^H)^T]^T\|_F^2 + \lambda \|X - D\alpha\|_F^2 \text{ s.t. } \forall l, \|\alpha_l\|_0 \leq T_1. \quad (3)$$

The objective function enforces: (a) the coarse scale coefficients of the HR MS image are close to those of the LR MS image; (b) the finer scale coefficients are close to those of the HR Pan image; and (c) the quad-tree vectors are sparse with respect to the learned dictionary. The weight $\lambda$ control the contribution of the sparse representation item.

When $\lambda=0$, the solution of equation (3) is identical to the conventional wavelet-based Pan-sharpening. To solve equation (3), we use an iterative method which iteratively updates $\alpha$ and X until convergence. We obtain the HR MS using the inverse wavelet transform on $\hat{X}_{MS}$. Pseudo code for the iterative method is shown in FIG. 2. In FIG. 2, the variable X is in the wavelet domain.

As shown in FIG. 1, input to the method is a LR MS image 101 and a HR Pan image 102. These two images are the training data for learning our dictionary.

The LR MS image is resized and registered 105 with the HR Pan image.

Then, we apply 103 wavelet transforms to both images.

Features 104 are extracted 110 from the wavelet coefficients for both images in the form of vectors. The vectors are decomposed 120 into vectors without missing values 105, and vectors with missing values 106.

The vectors without the missing values are used to construct a dictionary 107 using dictionary learning 130.

The missing coefficient are predicted (filled) 140 for the vectors with the missing coefficients. The coefficients are combined 150 to produce a fused wavelet coefficient map 155.

Pan-sharpening 170 is applied to obtain the Pan-sharpened MS image 109.

The above steps can be performed in a processor 100 as known in the art connected to memory and input/output interfaces.

Pseudo Code

The weight λ controls the contribution of the interpolated MS image. When λ=∞, the solution to Eqn. (3) is the interpolated MS image; and when λ=0, Eqn. (3) is equivalent to image inpainting. Eqn. (3) is solved by an iterative procedure as shown in FIG. 2. After we obtain $\hat{X}$, we can map $\hat{X}$ to the MS image $\hat{Z}$. In this pseudo code, X is in terms of wavelet coefficients.

EFFECT OF THE INVENTION

The embodiments of the invention provide a dictionary learning (DL) based Pan-sharpening method to reduce color distortion caused by interpolating MS images, without requiring a large number of training images.

Compared to conventional Pan-sharpening methods, the novelty of our DL based Pan-sharpening method lies in the following aspects.

The method focuses on generating the MS image with improved resolution using DL, instead of simply combining the coefficients in an obvious naïve way, we posit that each wavelet-tree vector of the fused map can be sparsely represented by dictionary learned from the wavelet-tree vectors of the Pan image.

The method does not require a large number of HR MS images to learn the dictionary, only the images need to be sharpened.

The method provides an iterative procedure to update the MS image according to image sparsity and consistency, yielding a MS image with less distortion.

In addition, our DL based method can be applied to hyperspectral data with minimal modifications.

We also provide a method for Pan-sharpening a panchromatic (Pan) image and a single multispectral (MS) image using a multi-scale wavelet dictionary.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for Pan-sharpening a single panchromatic (Pan) image and a single multispectral (MS) image, comprising:

interpolating the MS image to a resolution of the Pan image to produce an interpolated MS image;

applying a wavelet transform to the Pan image and the interpolated MS image to obtain a wavelet transformed Pan image and a wavelet transformed MS image;

extracting features, in the form of vectors of low frequency coefficients from the wavelet transformed MS image with missing high frequency coefficients, and features in the form of vectors of low frequency coefficients and high frequency coefficients from the wavelet transformed Pan image without missing values;

separating the features into features without missing values and features with missing values;

learning a dictionary from the features without missing values, wherein the features are sparsely represented in the dictionary;

predicting the values for the features with the missing values using the dictionary, wherein the predicting further comprises:

minimizing an objective function $$\hat{X}_{MS} = \mathrm{argmin}_{X,\alpha} \|X - [(X_{MS}{}^L)^T (X_{Pan}{}^H)^T]^T\|_F^2 + \lambda \|X - D\alpha\|_F^2 \; s.t. \; \forall l, \|\alpha_l\|_0 \le T_1. \quad (3)$$

where X is a set of L' features from an HR MS image, D is a dictionary and $\alpha = [\alpha_1, \alpha_2, \ldots, \alpha_L]$ is a set of sparse coefficient vectors representing X in the dictionary D, $T_1$ is a desired sparsity, and $\|\cdot\|_F$ denotes a Frobenius norm, λ is a non-zero weighting coefficient;

combining, after the predicting, the features of the low frequency wavelet coefficients and the high frequency coefficients to form a fused wavelet coefficient map; and applying an inverse wavelet transform to the fused wavelet coefficient map to obtain a fused MS image, wherein the steps are performed in a processor.

2. The method of claim 1, wherein the dictionary is learned using multi scale wavelet tree vectors.

3. The method of claim 1, wherein the dictionary has a quad-tree structure with different sized blocks at each wavelet decomposition level, and all level of the quad-tree structure are used to construct one joint global dictionary.

4. The method of claim 1 wherein the features include low frequency wavelet coefficients extracted from the wavelet transformed MS image and both low and high frequency coefficients extracted from the wavelet transformed Pan image.

5. The method of claim 1, further comprising:

registering the Pan image and the interpolated MS image with each other before the interpolating.

6. The method of claim 1, wherein the dictionary learning solves $$D = \mathrm{argmin}_{D,\alpha} \|X_{Pan} - D\alpha\|_F^2 \; s.t. \; \forall l, \|\alpha_l\|_0 \le T_0, \quad (1)$$

where $\alpha[\alpha_1, \alpha_2, \ldots, \alpha_L]$ is a set of sparse coefficient vectors corresponding to L training vectors, $T_0$ is a desired sparsity level, and $\|\cdot\|_F$ an denotes a Frobenius norm.

7. The method of claim 1 or 6, wherein the training data vectors comprise of feature vectors without missing values.

8. The method of claim 6, wherein the learning uses a K-singular value decomposition (SVD).

9. The method of claim 1 wherein the features are localized.

10. The method of claim 1 wherein the learned dictionary is localized.

11. The method of claim 10 wherein the localized dictionary is composed of tree vectors centered at a spatial location.

12. The method of claim 1, wherein the dictionary sparsely represents signals, and wherein the signals couple color and Pan features extracted from the interpolated MS and the Pan images, respectively.

13. The method of claim 1, wherein the interpolated MS image is a resized low resolution (LR) MS image.

14. The method of claim 1 wherein the e interpolated MS image an estimate of a high resolution (HR) MS image.

15. The method of claim 14, wherein, the interpolated MS image is used as a noisy version of the HR MS image, with a constraint on a noise level.

16. The method of claim 1 wherein a hyperspectral image is used instead of a MS image.

\* \* \* \* \*